(12) United States Patent
Jose et al.

(10) Patent No.: US 10,048,830 B2
(45) Date of Patent: Aug. 14, 2018

(54) SYSTEM AND METHOD FOR INTEGRATING MICROSERVICES

(71) Applicant: SAP SE, Walldorf (DE)

(72) Inventors: Aby Jose, Kottayam (IN); Vikas Gupta, Jaipur (IN)

(73) Assignee: SAP SE, Walldorf, DE (US)

( * ) Notice: Subject to any disclaimer, the term of this patent is extended or adjusted under 35 U.S.C. 154(b) by 446 days.

(21) Appl. No.: 14/958,260

(22) Filed: Dec. 3, 2015

(65) Prior Publication Data

US 2017/0160880 A1  Jun. 8, 2017

(51) Int. Cl.
   *G06F 3/0482* (2013.01)
   *G06F 3/0481* (2013.01)
   *G06F 8/34* (2018.01)

(52) U.S. Cl.
   CPC ............ *G06F 3/04817* (2013.01); *G06F 8/34* (2013.01)

(58) Field of Classification Search
   CPC ........... G06F 17/30958; G06F 9/45558; G06F 3/0482; G06F 3/04842; G06F 17/30554; G06F 17/30867; G06F 8/34; G06F 9/5077; G06F 3/067
   See application file for complete search history.

(56) References Cited

U.S. PATENT DOCUMENTS

| | | | | |
|---|---|---|---|---|
| 9,438,634 | B1* | 9/2016 | Ross | H04L 63/20 |
| 9,467,476 | B1* | 10/2016 | Shieh | H04L 63/20 |
| 2016/0269425 | A1* | 9/2016 | Shieh | H04L 63/0254 |

OTHER PUBLICATIONS

Donka Dimitrova, "SAP NetWeaver Business Process Management-End-to-End Process Implementation Sample," SAP Developer Network, Business Process Expert Community, Aug. 1, 2008.
Steffen Ulmer, "SAP NetWeaver BPM Tutorial for Beginners: My Name and Age—BPM Tutorial," SAP Community Network, Aug. 16, 2010.

* cited by examiner

*Primary Examiner* — Tadeese Hailu
(74) *Attorney, Agent, or Firm* — Fountainhead Law Group P.C.

(57) ABSTRACT

A computer implemented method of integrating microservices. The computer displays a graphical environment and determines a suggested next microservice according to usage data. At least one of the microservices may access a hardware sensor that generates measurement data for the at least one microservice.

20 Claims, 10 Drawing Sheets

Authorization MS 702

Catalog MS 704

Add To Cart MS 706

Payment MS 708

Shipment MS 710

SYSTEM AND METHOD FOR INTEGRATING MICROSERVICES

CROSS REFERENCE TO RELATED APPLICATIONS

Not applicable.

BACKGROUND

The present invention relates to microservices, and in particular, to tools for discovering and integrating microservices.

Unless otherwise indicated herein, the approaches described in this section are not prior art to the claims in this application and are not admitted to be prior art by inclusion in this section.

A "service" may be generally defined as any resource that is provided over a computer network such as the Internet. Services may also be referred to as cloud services. The most common cloud service resources are Software as a Service (SaaS), Platform as a Service (PaaS) and Infrastructure as a Service (IaaS).

SaaS is a software distribution model in which applications are hosted by a vendor or service provider and made available to customers over a network, typically the Internet. PaaS refers to the delivery of operating systems and associated services over the Internet without downloads or installation. IaaS involves outsourcing the equipment used to support operations, including storage, hardware, servers and networking components, all of which are made accessible over a network.

A "microservice" is a type of service. The microservice architectural style is an approach to developing a single application as a suite of small microservices, each running in its own process and communicating with lightweight mechanisms, often an HTTP (hypertext transfer protocol) resource API (application programming interface). These microservices may be built around feature capabilities and independently deployable by fully automated deployment machinery. There need only be a bare minimum of centralized management of these microservices, which may be written in different programming languages and use different data storage technologies.

There is no standard or official comparison or differentiator between a service and a microservice. The differences are subjective. Different organizations or researchers have various opinions about the size, performance, and structure of services versus microservices.

In the context of the present document, a service is any resource offered in the cloud. Hence microservices are also cloud services, but generally smaller in size, are independently manageable, and solve one purpose. But the reverse is not always true: All services are not microservices.

For example, HCP (Hana cloud platform) is a PaaS from SAP. It is a cloud service, under the category of PaaS. At the same time, there are various services that exist on HCP (e.g., a monitoring service, etc.), which can be accessed through API calls and are light weight and are capable of performing a well-defined specific job. So these are micro services.

Organizations have various implementation strategies for microservices according to their needs. There are no standard definitions about the size or lines of code for a microservice. However, it is accepted that microservices are designed to manage a specific feature requirement (the size of the feature requirement varies from organization to organization).

In summary, microservices are a cloud based feature for building cloud applications easily. These are reusable self-contained entities which help to improve the development, maintenance and lifecycle of a cloud application more effectively. The traditional way to use microservices is to use a textual interface to write textual computer programs that use the microservice.

SUMMARY

Given the above, a number of issues are presented. First, the traditional way for a user to access a microservice is by writing a short, textual computer program that provides the inputs to the microservice, configures and calls the microservice, and receives the outputs from the microservice. Since the microservices are lightweight, generally multiple microservices are programmatically linked together in order to implement a larger function. For example the output of one microservice is programmatically linked to be the input to another microservice. The programs that configure, call and link the microservices are generally short, but the textual interface for writing these short, textual programs is still a bit daunting for casual users (e.g., bottom 60%). In addition, as additional microservices are linked together in the textual program, the display of the textual program information grows in complexity, even from the point of view of experienced users (e.g., top 30%) or super users (e.g., top 10%). There is a need for a technical solution to augment or replace the existing textual interface for using microservices.

Second, the number of microservices is increasing. This presents the issue of how a user can become aware of new microservices. There is a need for a technical solution not only to present new microservices to a user, but also to suggest those microservices that are most relevant to the user's current activity.

In one embodiment, a computer implemented method integrates microservices. The method includes storing, by a computer system, a plurality of microservice objects and a plurality of usage data. The plurality of usage data corresponds to prior usage of the plurality of microservice objects. The method further includes executing, by the computer system, a graphical environment for displaying and arranging one or more of the plurality of microservice objects. The method further includes receiving, by the computer system, a user selection of a first microservice object of the plurality of microservice objects and an arrangement of the first microservice object in the graphical environment. The method further includes determining, by the computer system, a list of suggested microservice objects of the plurality of microservice objects. The computer system determines the list by processing the plurality of usage data according to at least the first microservice object. The list of suggested microservice objects includes one or more of the plurality of microservice objects that follow the first microservice object according to the plurality of usage data. The method further includes receiving, by the computer system, a user selection of a second microservice object and an arrangement of the second microservice object in the graphical environment. The second microservice object is one of the suggested microservice objects from the list. The second microservice object is linked to the first microservice object by a link according to the plurality of usage data.

Each microservice object of the plurality of microservice objects may include a functional component and a graphical component. The graphical component is a graphical representation of the functional component. The functional component defines one or more inputs to the microservice object, one or more outputs from the microservice object, and a call to a microservice that is related to the microservice object.

The plurality of microservice objects may relate to a plurality of microservices. At least one microservice of the plurality of microservices accesses a hardware sensor that generates measurement data for the at least one microservice. The hardware sensor may be one of a temperature sensor that generates temperature data, a motion sensor that generates motion data, a global positioning system (GPS) sensor that generates GPS data, a barcode scanner that generates barcode data, a microphone that generates audio data, a camera that generates image data, and a radio frequency identification (RFID) sensor that generates RFID data.

The computer system may process the plurality of usage data according to multiple microservice objects, wherein the multiple microservice objects includes the first microservice object.

The computer system may process the plurality of usage data according to at least one of popularity information, geographical information, user experience information, user rating information, execution count information, and recently used information.

The computer system may process the plurality of usage data by assigning a weight to at least one of popularity information, geographical information, user experience information, user rating information, execution count information, and recently used information.

The link between the first microservice object and the second microservice object may link at least one output of the first microservice object and at least one input of the second microservice object.

The method may further include updating, by the computer system, the plurality of usage data according to the user selection of the second microservice object as related to the first microservice object. The computer system may update the plurality of usage data by adding a data item to the plurality of usage data. The data item includes the second microservice object as related to the first microservice object and at least one of time stamp information, geographical information, execution count information, user experience information and user rating information.

The method may further include receiving, by the computer system, a user selection of multiple microservice objects that are linked together in a program flow, where the multiple microservice objects include the first microservice object and the second microservice object.

The method may further include executing, by the computer system, a program flow that includes the first microservice object and the second microservice object. The method may further include updating, by the computer system, the plurality of usage data according to executing the program flow.

A system may implement the above method, using a computer (e.g., a server computer, a database system, a client computer, etc.) to integrate microservices. A computer readable medium may store a computer program for controlling a computer to implement the above method.

As a result, embodiments save time by the user in integrating microservices. In addition, embodiments assist the user in discovering new or appropriate microservices by suggesting relevant microservices according to the usage data.

The following detailed description and accompanying drawings provide a better understanding of the nature and advantages of the present invention.

BRIEF DESCRIPTION OF THE DRAWINGS

FIG. 7 is a diagram of microservices in an online shopping service 700.

DETAILED DESCRIPTION

Figure 1:
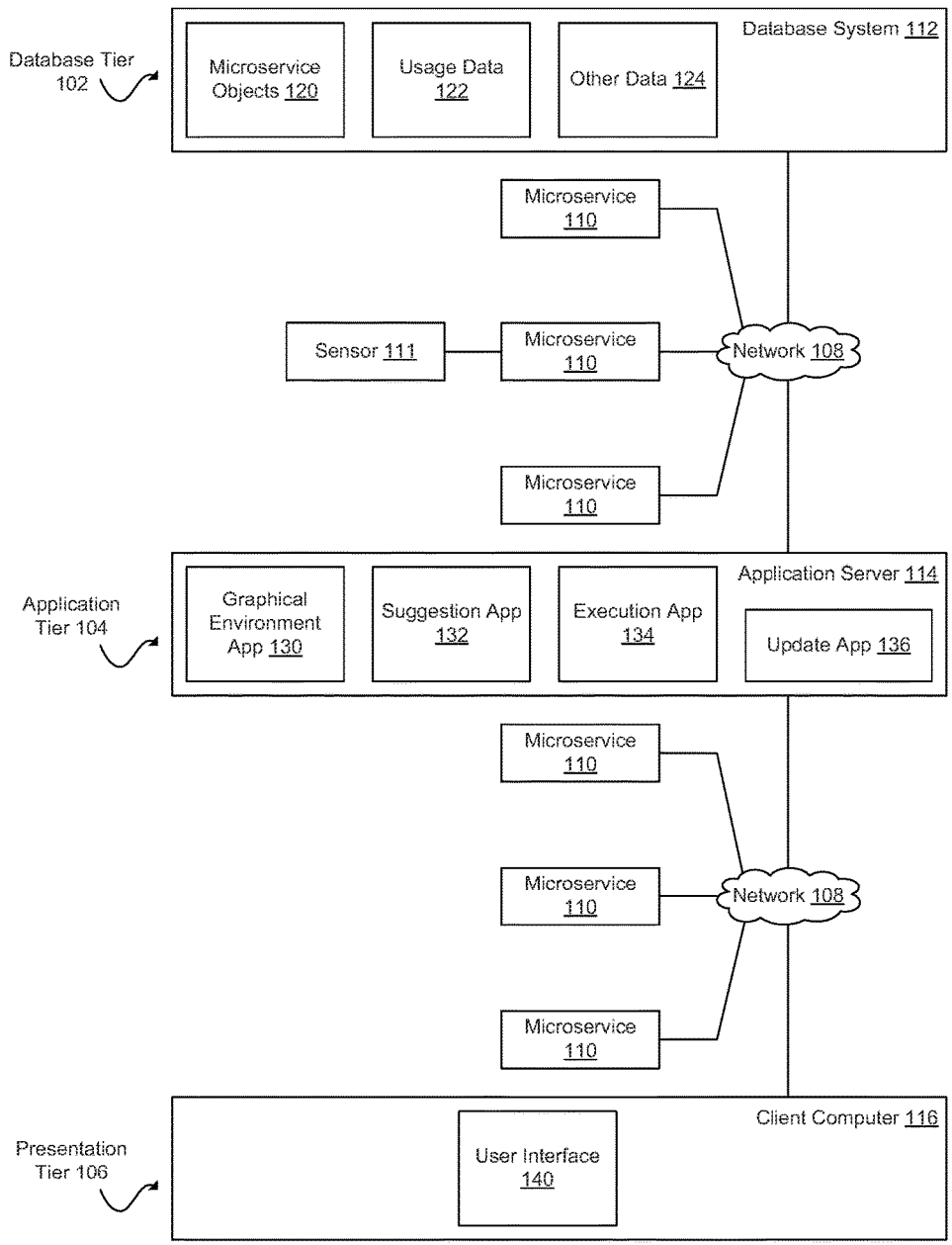
FIG. 1 is a block diagram of a system 100.

Described herein are techniques for integrating microservices. In the following description, for purposes of explanation, numerous examples and specific details are set forth in order to provide a thorough understanding of the systems and methods described herein. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

In this document, the term "server" is used. In general, a server is a hardware device, and the descriptor "hardware" may be omitted in the discussion of a hardware server. A server may implement or execute a computer program that controls the functionality of the server. Such a computer program may also be referred to functionally as a server, or be described as implementing a server function; however, it is to be understood that the computer program implementing server functionality or controlling the hardware server is more precisely referred to as a "software server", a "server component", or a "server computer program".

In this document, the term "database" is used. In general, a database is a data structure to organize, store, and retrieve large amounts of data easily. A database may also be referred to as a data store. The term database is generally used to refer to a relational database, in which data is stored in the form of tables and the relationship among the data is also stored in the form of tables. A database management system (DBMS) generally refers to a hardware computer system (e.g., persistent memory such as a disk drive, volatile memory such as random access memory, a processor, etc.) that implements a database.

In this document, the terms "service", "microservice", and "microservice object" are used. At a general level these terms are interchangeable, and the specific meaning is inferable from context. More specifically, a microservices is a service, but not all services are microservices. A microservice object is a local representation of a microservice.

FIG. 1 is a block diagram of a system 100. The system 100 is configured as a three-tier architecture system, having a database tier 102, an application tier 104, and a presentation tier 106. The tiers are connected by one or more computer networks 108, such as an intranet or the Internet. Various microservices 110 are also available via the network 108. The microservices 110 may be implemented by one or more other computers (not shown), or may be implemented by the application server 114. At least one of the microservices 110 may interact with one or more hardware sensors 111, as further discussed below.

The database tier 102 is generally implemented by a database system 112. The database system 112 generally includes persistent storage (e.g., one or more hard disk drives) that stores data in the form of databases. The database system 112 may be implemented by one or more computers that include a processor and a memory. The database system 112 includes a microservice objects database 120, a usage database 122, and other databases 124. The microservice objects database 120 stores microservice objects, as discussed in more detail below. The usage database 122 stores usage data related to the microservice objects. The other databases 124 store other data, such as the programs used to link or connect sets of microservice objects into a program flow.

The application tier 104 is generally implemented by an application server 114. The application server 114 generally executes various applications (computer programs). For example, the application server 114 may implement a database application that stores and retrieves information using the database system 112. The application server 114 may be implemented by one or more computers that include a processor and a memory. The application server 114 includes a graphical environment application 130, a suggestion application 132, an execution application 134, and an update application 136. The graphical environment application 130 implements a graphical environment for a user to interact with microservice objects, for example by allowing the user to select microservice objects from the microservice objects database 120 and to arrange the selected microservice objects into a program flow. The suggestion application 132 suggests microservice objects to the user according to the usage data in the usage database 122. The execution application 134 executes program flows created using the graphical environment application 130 (e.g., as stored in the other databases 124). The update application 136 updates the usage data according to the order in which the microservice objects are arranged in the program flow, or the order in which the microservice objects in the program flow are executed. The application server 114 may include other applications, a description of which is omitted for brevity.

The presentation tier 106 is generally implemented by a client computer 116. The client computer 116 generally implements a user interface 140 for a user to interact with applications executed by the application server 114. The client computer 116 may include a processor, a memory, user output devices such as a display, and user input devices such as a keyboard and mouse.

As mentioned above, the microservice objects database 120 stores microservice objects. A microservice object is an object that represents a microservice (e.g., one of the microservices 110). A microservice object includes a functional component and a graphical component. The graphical component is a graphical representation of the functional component, and represents the microservice object as it is arranged in the graphical environment, for example in a program flow. The functional component defines one or more inputs to the microservice object, one or more outputs from the microservice object, a call to one of the microservices 110 that is related to the microservice object, and any other data used by the related microservice.

For example, consider a temperature microservice. The temperature microservice is one of the microservices 110 available via the network 108. The temperature microservice may have one or more inputs. For example, if the temperature microservice may connect to more than one temperature sensor (e.g., one of the sensors 111), the input includes an identifier of a specific temperature sensor to which the temperature microservice is to connect. If the temperature microservice may present its output in either Celsius or Fahrenheit format, the input selects the format. The temperature microservice returns as its output the temperature measurement made by the specific temperature sensor. The microservice object (in the microservice objects database 120) that corresponds to the temperature microservice may be referred to as the temperature microservice object. The temperature microservice object accepts as its defined input the identifier for a specific temperature sensor to provide to the temperature microservice, and generates as its defined output the temperature measurement received from the temperature microservice. The temperature microservice object also includes technical access details such as the address of the temperature microservice, access permissions, etc. To use the temperature microservice, the user selects and configures the temperature microservice object in the graphical environment, as controlled by the graphical environment application 130 and the user interface 140.

Figure 2:
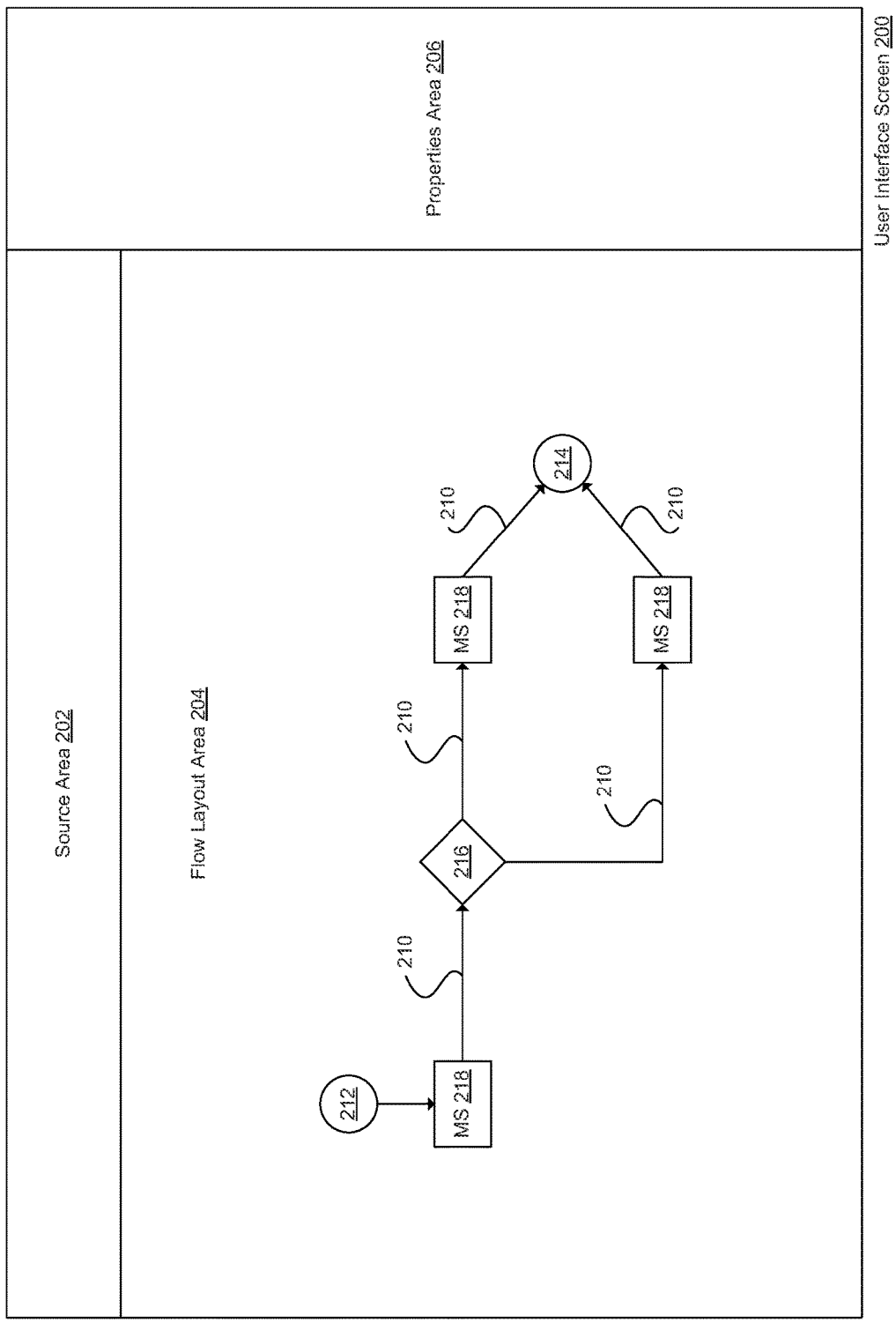
FIG. 2 is a diagram of an example user interface screen 200.

FIG. 2 is a diagram of an example user interface screen 200. (Note that the "user" discussed here is more accurately described as the "developer"; once the developer has created the program flow, it may be executed by the "end user". Further note that the developer and the end user may be the same person, but the different labels may be used to describe the different functions the user is performing.) The user interface screen 200 may be implemented by the graphical environment application 130 (see FIG. 1) as executed by the application server 114 (see FIG. 1), and displayed by the client computer 116. The user interface screen includes a source area 202, a flow layout area 204, and a properties area 206.

The source area 202 generally displays the microservices available for the user to select. The source area 202 may display the micro services grouped together hierarchically or in an outline format. For example, similar microservices may be grouped together under a descriptive header. The user may click on a header to expand the group of microservices under that header, or may click again to collapse the group of microservices under than header. The groups may be nested within other headers. For example, Header 1 may be expanded to display Subheader 1 and Subheader 2. Subheader 1 may be expanded to display Microservices 1-2, and Subheader 2 may be expanded to display Microservices 3-12. The user can then browse the source area 202 to find relevant microservices. Each of the microservices in the source area 202 corresponds to one of the microservices (e.g., 110 in FIG. 1) that is available to the user.

The source area 202 may include a search box. When the user enters search terms into the search box, the system displays a list of microservices (or groups of microservices, e.g. by header) that meet the search terms.

The user may select a microservice from the source area and drag it into the flow layout area 204.

The flow layout area 204 generally displays microservice (MS) objects 218 corresponding to the microservices that the user has selected and dragged from the source area 202. The flow layout area 204 allows the user to arrange multiple microservice objects 218 linked together with links to form an integrated program flow. The user may arrange the microservice objects 218 using flow lines 210, a start box 212, and end box 214, a decision box 216, or other graphical design or control elements. The flow lines 210 indicate the data flow from one box to another. The start box 212 indicates the start of the program flow, and the end box 214 indicates the end of the program flow. The decision box 216 allows the user to define various criteria to control branching of the program flow.

The properties area 206 generally displays the properties of a selected object in the flow layout area 204, and allows the user to edit the properties. For example, a microservice object may have input properties, output properties, operational properties, or other properties. The input properties and output properties define the inputs to and outputs from the selected object. For example, the input properties to a microservice object may be the outputs from another microservice object. The operational properties define various operational parameters for the selected object. For example, for a decision object, the operational properties define the decision and define the flow options that follow from the outcomes of the decision. As another example, for a microservice object, the operational properties define properties such as the link to the related microservice, as well as any parameters that are to be passed to the related microservice (e.g., permissions, etc.). The other properties include any other data that the user would like to associate with the selected object, such as notes.

A general use case for the user interface screen 200 screen is as follows. First, the user drags a start box (e.g. 212) into the flow layout are 204. Next, the user selects a first microservice from the source area 202 and drags the first microservice into the flow layout are 204; the system displays the first microservice as one of the microservice objects 218. Next, the user selects a flow line to connect the start box to the input of the first microservice object. Next, the user selects a second microservice from the source area 202 and drags the second microservice into the flow layout area 204. Next, the user selects a flow line to connect the output of the first microservice object to the input of the second microservice object. Next, the user continues selecting objects, arranging them, and linking them with flow lines to form the program flow. Finally, the user drags an end box (e.g., 214) into the flow layout area 204, and selects a flow line to connect the output of the last microservice object to the end box.

In addition to the user selecting microservices from the source area 202, the system (e.g., the application server 114 of FIG. 1) may also use usage data (e.g., stored in the usage database 122 of FIG. 1) to suggest microservices that are appropriate for the user's current task. The suggestion process is described in more detail below.

The microservices listed in the source area 202 generally include all the microservices that the system (eg., the application server 114) has implemented with microservice objects (e.g., stored in the microservice objects database 120). General categories of microservices include platform layer microservices and application layer microservices. These may be considered to be the main headers.

Within the platform layer header, subheaders may include persistence microservices, monitoring and logging microservices, and security services. The microservices within the persistence subheader may include database as a microservice and document microservice. The microservices within the monitoring and logging subheader may include monitoring microservice, audit log microservice, pattern recognition microservice, and health check service. The microservices within the security subheader may include key store microservice, OAuth authorization microservice, and messaging microservice.

Within the application layer header, subheaders may include e-commerce microservices, IoT (Internet of Things) microservices, healthcare microservices, finance microservices, and sensor microservices. The microservices within the e-commerce subheader may include catalog microservice, payment microservice, loyalty microservice, feedback microservice, and notification microservice. The microservices within the IoT subheader may include data collection microservice, unit conversion microservice, data filtering microservice, and data aggregation microservice. The microservices within the healthcare subheader may include patient registration microservice, medical history microservice, and feedback microservice. The microservices within the finance subheader may include tax calculation microservice, payment card validation microservice, and payment due notification microservice.

Sensor microservices, in general, involve a hardware sensor (e.g., the sensor 111 in FIG. 1) that is related to the microservice. The hardware sensor generates sensor data, for example in response to a connection or query from the microservice to the hardware sensor. Hardware sensors include a temperature sensor that generates temperature data, a motion sensor that generates motion data, a global positioning system (GPS) sensor that generates GPS data, a barcode scanner that generates barcode data, a microphone that generates audio data, a camera that generates image data, and a radio frequency identification (RFID) sensor that generates RFID data. Thus, the microservices within the sensor subheader may include temperature microservice, motion microservice, GPS microservice, barcode microservice, microphone microservice, camera microservice, and RFID microservice.

Figure 3:
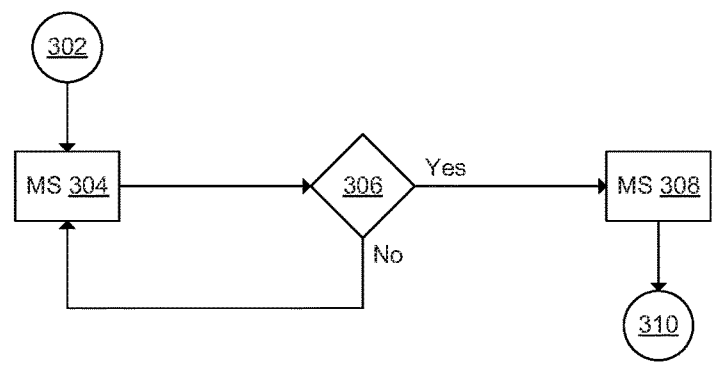
FIG. 3 is a flow diagram of a program flow 300.

FIG. 3 is a flow diagram of a program flow 300. The program flow 300 shows a program flow as it would appear in the flow layout area 204 (see FIG. 2) for configuration by the user. The program flow 300 is a serial program flow. The program flow 300 includes a start box 302, a first microservice object 304, a decision box 306, a second microservice object 308, and an end box 310. Arrows between the elements of the program flow 300 show the data flow. For example, if the result of the decision box 306 is No, the flow returns to the first microservice object 304. If the result of the decision box 306 is Yes, the flow proceeds to the second microservice object 308.

Figure 4:
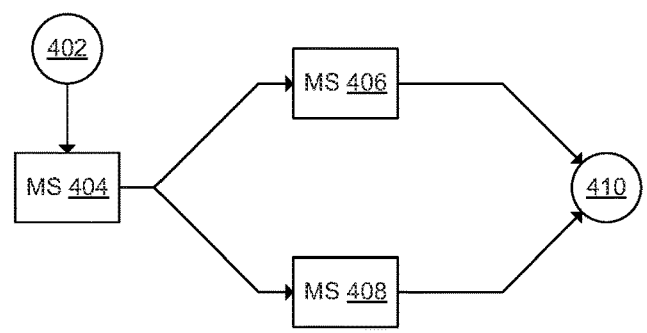
FIG. 4 is a flow diagram of a program flow 400.

FIG. 4 is a flow diagram of a program flow 400. The program flow 400 shows a program flow as it would appear in the flow layout area 204 (see FIG. 2) for configuration by the user. The program flow 400 is a parallel program flow. The program flow 400 includes a start box 402, a first microservice object 404, a second microservice object 406, a third microservice object 408, and an end box 410. Arrows between the elements of the program flow 400 show the data flow. For example, the first microservice object 404 provides its output to both the second microservice object 406 and the third microservice object 408.

Figure 5:
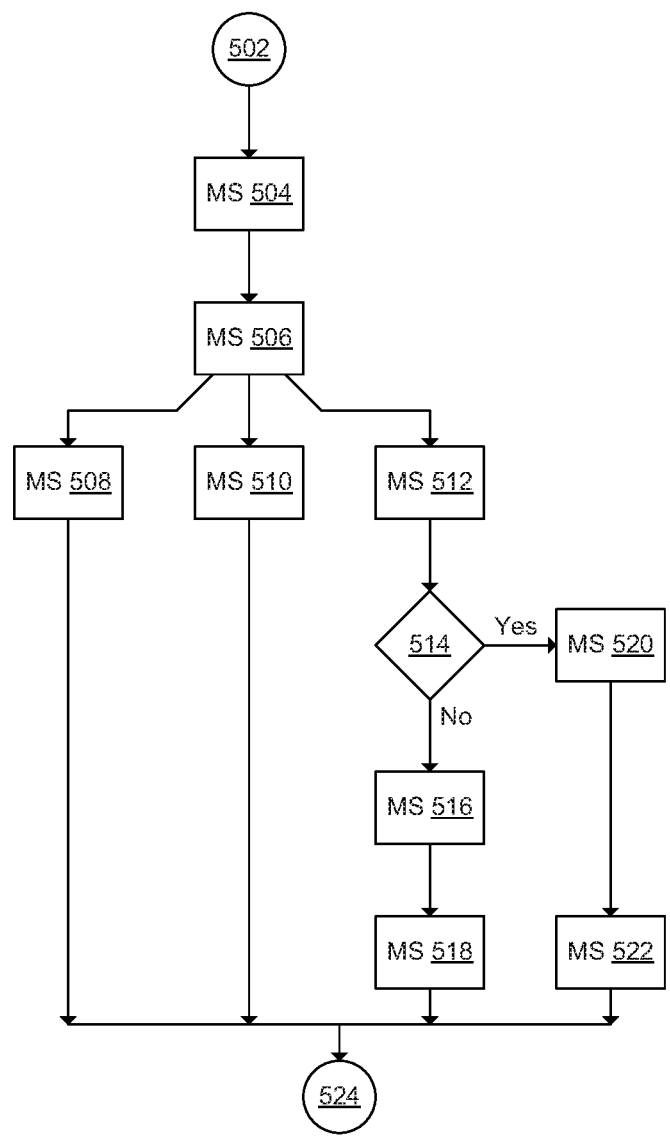
FIG. 5 is a flow diagram of a program flow 500.

FIG. 5 is a flow diagram of a program flow 500. The program flow 500 shows a program flow as it would appear in the flow layout area 204 (see FIG. 2) for configuration by the user. The program flow 500 has both serial and parallel elements. The program flow 500 includes a start box 502, microservice objects 504, 506, 508, 510, 512, 516, 518, 520 and 522, a decision box 514, and an end box 524. Arrows between the elements of the program flow 500 show the data flow.

Figure 6A:
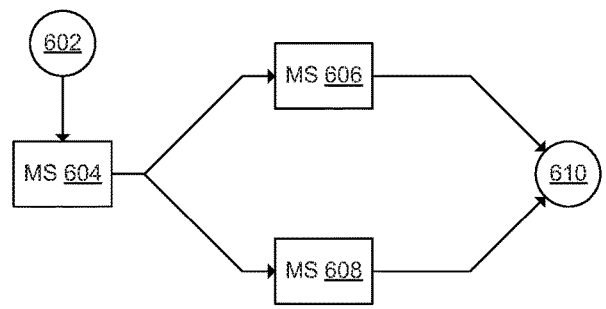
FIG. 6A is a flow diagram of a program flow 600.

FIG. 6A is a flow diagram of a program flow 600. The program flow 600 shows a program flow as it would appear in the flow layout area 204 (see FIG. 2) for configuration by the user. The program flow 600 includes a start box 602, microservice (MS) objects 604, 606 and 608, and an end box 610. Arrows between the elements of the program flow 600 show the data flow.

Figure 6B:
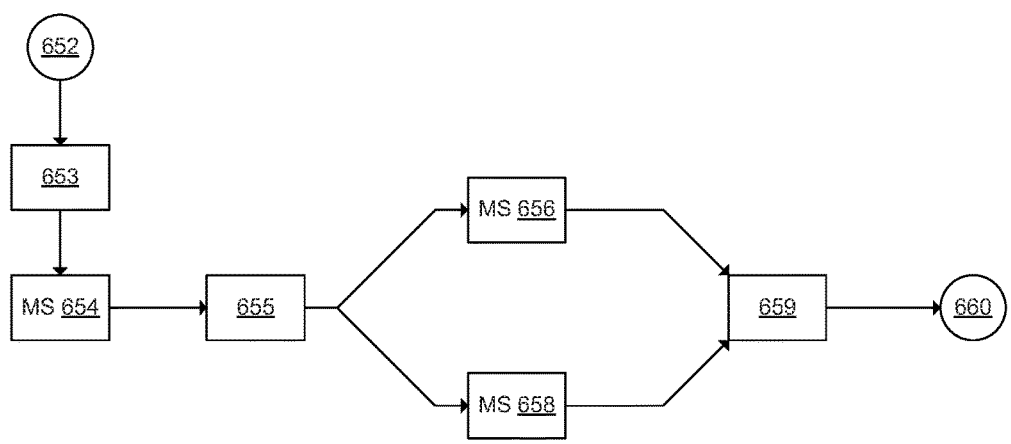
FIG. 6B is a flow diagram 650 showing how the program flow 600 (see FIG. 6A) is executed.

FIG. 6B is a flow diagram 650 showing how the program flow 600 (see FIG. 6A) is executed. For example, the application server 114 (see FIG. 1) runs the execution application 134 (see FIG. 1) to execute the program flow 600. The execution is as follows. After the start box 652, the box 653 indicates that the application server 114 runs the execution application 134 to process the program flow 600. Based on the program flow 600, the application server 114 calls the microservice 654 that corresponds to the microservice object 604 (see FIG. 6A). The box 655 indicates that after the microservice 654 has generated its results, the application server 114 provides the results of the microservice 654 as it calls the microservice 656 (corresponding to the microservice object 606 of FIG. 6A) and the microservice 658 (corresponding to the microservice object 608 of FIG. 6A). The box 659 indicates that after the microservices 656 and 658 have generated their results, the application server 114 outputs the results and proceeds to the stop box 660 (corresponding to the stop box 610 of FIG. 6A). At this point the execution of the program flow 600 is complete.

FIG. 7 is a diagram of microservices in an online shopping service 700. The online shopping service 700 includes a selection of microservices (MS) to implement an online shopping service. For example, the user may have an awareness of subfunctions in an online shopping service, and may have selected the microservices in FIG. 7 in order to fulfill those subfunctions. The online shopping service 700 includes an authorization microservice 702, a catalog microservice 704, an add to cart microservice 706, a payment microservice 708, and a shipment microservice 710. The microservices in FIG. 7 represent the actual microservices (e.g., the microservices 110 in FIG. 1) that will be arranged in a program flow (using microservice objects) and called when the program flow is executed. The microservices in FIG. 7 are further discussed with reference to FIG. 8.

Figure 8:
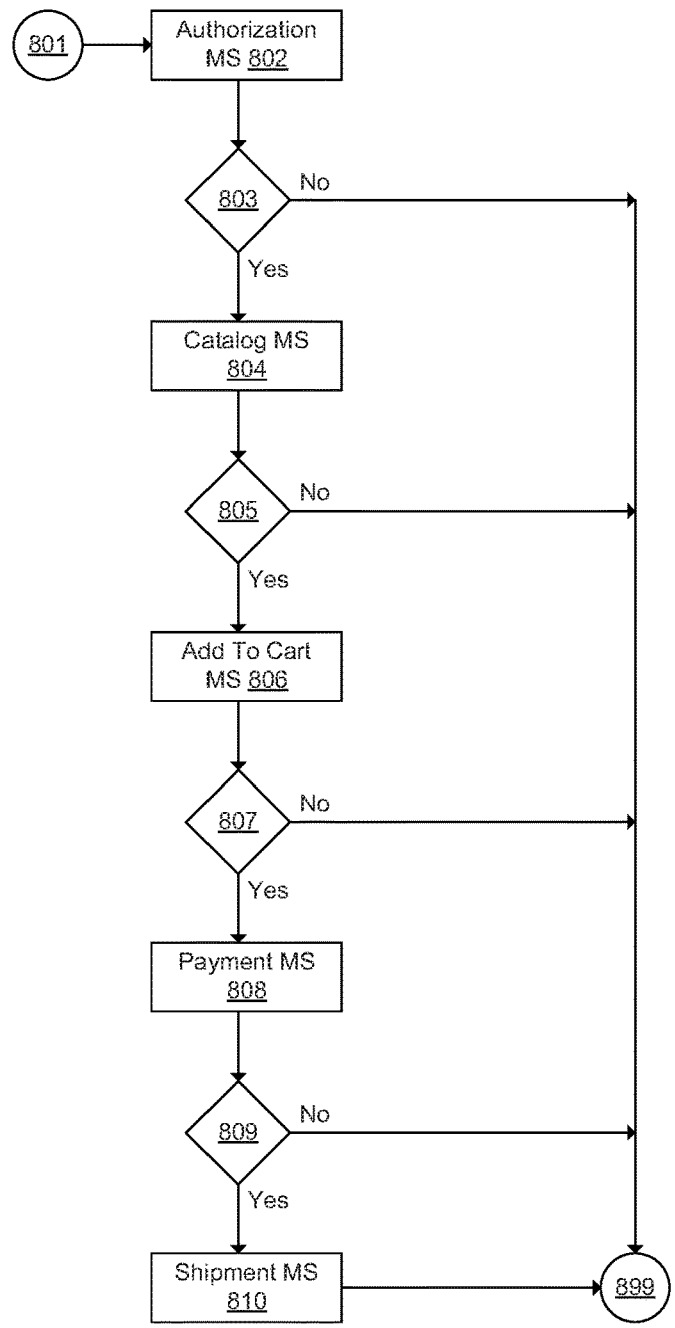
FIG. 8 is a flow diagram of a program flow 800 that implements the online shopping service 700 (see FIG. 7).

FIG. 8 is a flow diagram of a program flow 800 that implements the online shopping service 700 (see FIG. 7). The program flow 800 shows a program flow as it would appear in the flow layout area 204 (see FIG. 2) for configuration by the user. (Note that the following description discusses the execution of the program flow 800 by the system e.g. the application server 114, so the "user" mentioned is the user of the online shopping service 700, not the user who created the program flow 800.) The program flow 800 starts at the start box 801, then proceeds to the authorization microservice object 802.

The authorization microservice object 802 takes as its input customer authorization information (e.g., login information) and calls the authorization microservice 702 (see FIG. 7) using the customer authorization information. The authorization microservice 702 determines whether the customer is authorized to use the online shopping service and returns an acknowledgement to the authorization microservice object 802. For example, the authorization microservice 702 may query a customer database (not shown) using the received customer authorization information to determine whether the customer corresponds to an authorized customer. After receiving the authorization from the authorization microservice 702, the program flow proceeds to the decision box 803.

At the decision box 803, if the customer is not authorized (according to the output received from the authorization microservice 702), the program flow 800 proceeds to the end box 899. If the customer is authorized (according to the output received from the authorization microservice 702), the program flow 800 proceeds to the catalog microservice object 804.

The catalog microservice object 804 takes as its input the output of the decision box 803. That is, when the user is authorized, the catalog microservice object 804 is to perform its function. The catalog microservice object 804 calls the catalog microservice 704 (see FIG. 7). The catalog microservice object 804 may provide other information to the catalog microservice 704, such as the user information, a user selection of a particular catalog, etc. The catalog microservice 704 returns catalog listings to the catalog microservice object 804. The catalog microservice object 804 displays the catalog listings for the user, and receives user selection of one of the products in the catalog listings. The program flow proceeds to the decision box 805.

At the decision box 805, the system determines whether the user has made a selection of one of the products in the catalog listings (see 804). For example, the decision box 805 may implement a timeout (e.g., 5 minutes). If the user has not made a selection within the timeout, the program flow proceeds to the end box 899. If the user has made a selection, the program flow proceeds to the add to cart microservice object 806.

The add to cart microservice object 806 takes as its input the product the user selected (see 804), calls the add to cart microservice 706 (see FIG. 7). The add to cart microservice 706 adds the product to the user's cart and returns an acknowledgement to the add to cart microservice object 806. The add to cart microservice object 806 may allow for multiple calls to the add to cart microservice 706 when the user selects more than one product. The program flow proceeds to the decision box 807.

At the decision box 807, the system determines whether the add to cart microservice 706 has sent its acknowledgement. For example, the decision box 807 may implement a timeout (e.g., 10 seconds). If the acknowledgment has not been received from the add to cart microservice 706 within the timeout, the program flow proceeds to the end box 899. If the acknowledgment has been received from the add to cart microservice 706, the program flow proceeds to the payment microservice object 808.

The payment microservice object 808 takes as its inputs a cart identifier (provided by the add to cart microservice object 806) and payment information received from the user, and calls the payment microservice 708 (see FIG. 7). The payment microservice 708 applies the payment information to the items in the cart and returns an acknowledgement to the payment microservice object 808. The program flow proceeds to the decision box 809.

At the decision box 809, the system determines whether the payment microservice 708 has sent its acknowledgement. For example, the decision box 809 may implement a timeout (e.g., 10 seconds). If the acknowledgment has not been received from the payment microservice 708 within the timeout, the program flow proceeds to the end box 899. If the acknowledgment has been received from the payment microservice 708, the program flow proceeds to the shipment microservice 810.

The shipment microservice object 810 takes as its inputs the cart identifier and shipping information (e.g., stored in a user profile of the user, entered by the user, etc.), and calls the shipment microservice 710 (see FIG. 7). The shipment microservice 710 arranges shipment of the products in the user's cart (e.g., selecting a shipping carrier, etc.) and returns an acknowledgement to the shipment microservice object 810. The acknowledgement may include tracking information, an estimated delivery date, etc. The program flow proceeds to the end box 899.

At the end box 899, the system ends execution of the program flow 800. If the end box 899 was not entered from the shipment microservice object 810 (e.g., there was a failure to receive the acknowledgement at the decision box 807), the system may generate a failure message that indicates the failure. Otherwise the system may generate a success message (e.g., including order confirmation information, payment confirmation information, shipping confirmation information, etc.).

Figure 9:
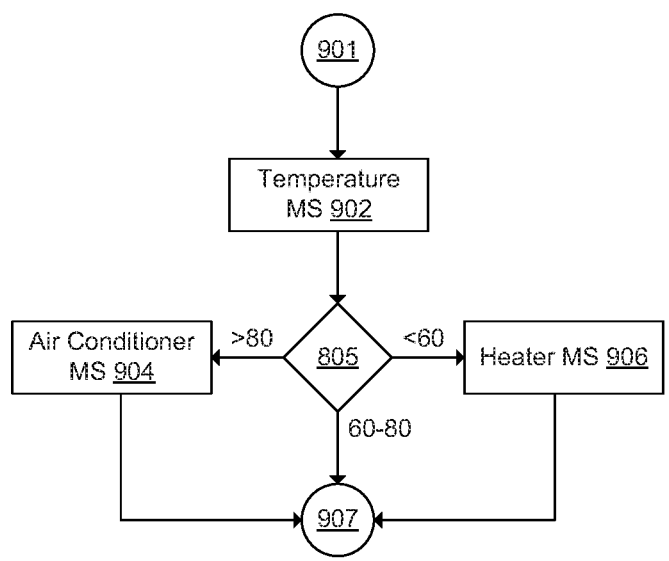
FIG. 9 is a flow diagram of a program flow 900 that implements a home environment monitor service.

FIG. 9 is a flow diagram of a program flow 900 that implements a home environment monitor service. The program flow 900 shows a program flow as it would appear in the flow layout area 204 (see FIG. 2) for configuration by a developer. The program flow 900 may be implemented by a system such as the application server 114 (see FIG. 1). An end user may instruct the system to execute the program flow 900 in order to implement the home environment monitor service. The program flow 900 starts at the start box 901, then proceeds to the temperature microservice object 902.

The temperature microservice object 902 calls a temperature microservice. The temperature microservice may be one of the microservices 110 (see FIG. 1). The temperature microservice accesses a temperature sensor. The temperature sensor may be one of the sensors 111 (see FIG. 1). For example, the temperature sensor may be at the end user's home, and the temperature microservice may be implemented by a monitoring company that also implements the system for developing and executing the program flow 900 (e.g., the application server 114). As another example, the temperature sensor may be one of multiple temperature sensors at the end user's home, and the temperature microservice may be implemented by a computer at the end user's home that also implements the system for developing and executing the program flow 900; alternatively the program flow 900 may be developed on and executed by a remote system such as the application server 114. The temperature microservice object 902 may provide inputs to the temperature microservice, such as authorization information and identification information of the temperature sensor. The temperature microservice returns temperature data to the temperature microservice object 902, and the program flow proceeds to the decision box 903.

At the decision box 903, the system compares the temperature data with various thresholds. If the temperature is between 60 and 80 degrees Fahrenheit, the program flow proceeds to the end box 907. If the temperature is above 80 degrees Fahrenheit, the program flow proceeds to the air conditioner microservice object 904. If the temperature is below 60 degrees Fahrenheit, the program flow proceeds to the heater microservice object 906.

The air conditioner microservice object 904 calls an air conditioner microservice. The air conditioner microservice turns on an air conditioner, e.g. at the end user's home. The air conditioner microservice may be implemented remotely (e.g., by the application server 114 or by another remote computer) or by a computer at the end user's home. The air conditioner itself may include a processor that implements the air conditioner microservice. The program flow proceeds to the end box 907.

The heater microservice object 906 calls a heater microservice. The heater microservice turns on a heater, e.g. at the end user's home. The heater microservice may be implemented remotely (e.g., by the application server 114 or by another remote computer) or by a computer at the end user's home. The heater itself may include a processor that implements the heater microservice. The program flow proceeds to the end box 907.

At the end box 907, the system ends execution of the program flow 900.

In a similar manner, other program flows may include access to sensors other than the temperature sensor.

Figure 10:
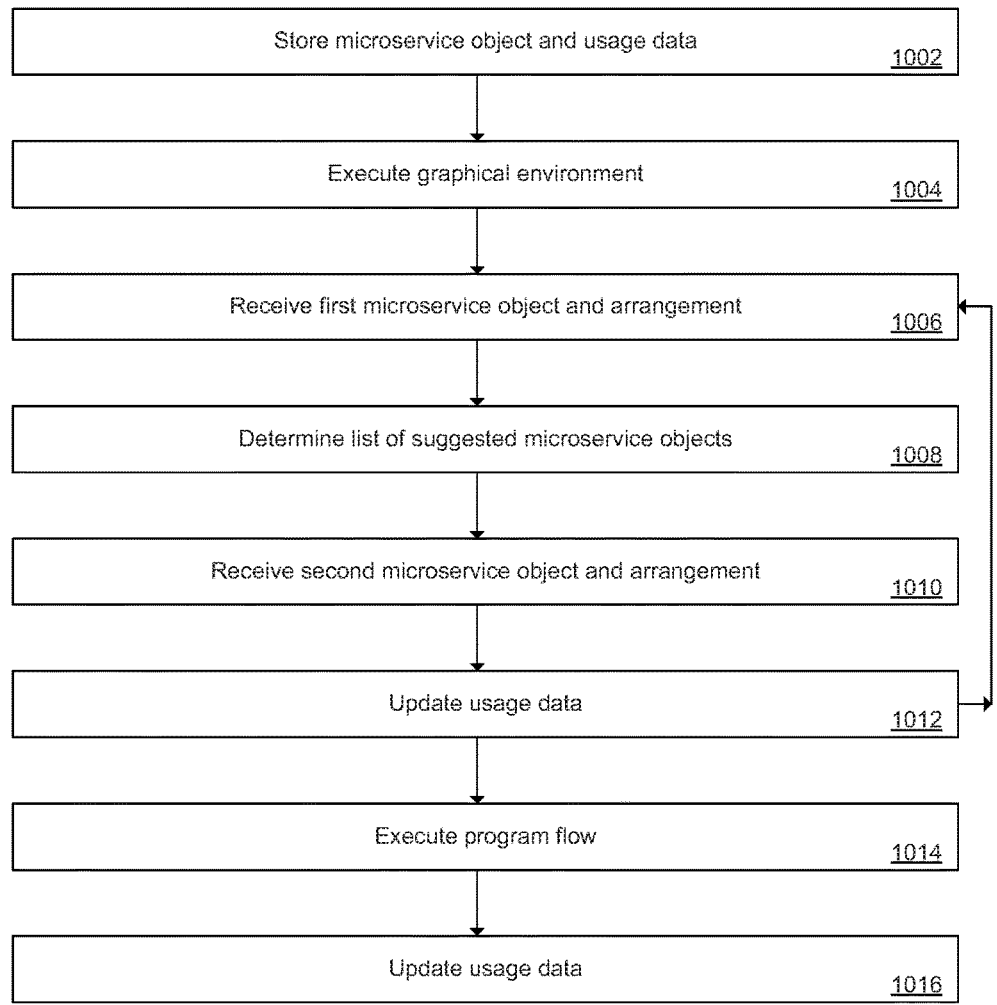
FIG. 10 is a flow diagram of a method 1000 of integrating microservices.

FIG. 10 is a flow diagram of a method 1000 of integrating microservices. The method 1000 may be performed by the system 100 (see FIG. 1), or by one or more components thereof (e.g., the client computer 116, the application server 114, the database system 112, etc.), for example as controlled by one or more computer programs.

At 1002, a plurality of microservice objects and a plurality of usage data are stored. The usage data corresponds to prior usage of the microservice objects. A computer system (e.g., the database system 112) may store this information. Note that "store", "stored" and "storing" in this context refer to the state of being stored, e.g. "to have stored" or "have been stored".

At 1004, a graphical environment for displaying and arranging one or more of the microservice objects is executed. A computer system (e.g., the application server 114) may execute the graphical environment, e.g. using the graphical environment application 130. The graphical environment may implement a user interface screen such as the interface screen 200 (see FIG. 2).

At 1006, a user selection of a first microservice object and an arrangement of the first microservice object in the graphical environment is received. For example, the application server 114 may receive the user selection and the arrangement from the client computer 116, according to keyboard strokes or mouse movements in response to information displayed by the user interface.

At 1008, a list of suggested microservice objects of the plurality of microservice objects is determined. For example, the application server 114 may determine the list using the suggestion application 132. The computer system determines the list by processing the usage data according to at least the first microservice object. The list of suggested microservice objects includes one or more of the plurality of microservice objects that follow the first microservice object according to the usage data. The suggestion process is discussed in more detail below.

At 1010, a user selection of a second microservice object and an arrangement of the second microservice object in the graphical environment is received. For example, the application server 114 may receive the user selection and the arrangement from the client computer 116, according to keyboard strokes or mouse movements in response to information displayed by the user interface. The second microservice object is one of the suggested microservice objects from the list. The second microservice object is linked to the first microservice object by a link according to the plurality of usage data. For example, if the list suggests that the second microservice object follows the first microservice object, a flow arrow is used to link the output of the first microservice object to the input of the second microservice object.

At 1012, the usage data is updated according to the user selection of the second microservice object as related to the first microservice object. For example, the application server 114 may instruct the database system 112 to update the usage database 122, as controlled by the update application 136. As the usage database 122 is updated with additional usage data from multiple users, the system is able to make suggestions to a user that correspond to what other users have done in the past.

The steps 1006, 1008, 1010 and 1012 may be repeated as desired for the user to add more microservice objects (a third microservice object, a fourth microservice object, etc.) to form a program flow. The system may also enable the user to add other objects such as a start box, an end box, and a decision box, as well as to add or remove flow arrows between objects, as described above regarding FIG. 2. The system may store the program flow in the other data database 124 (see FIG. 1).

At 1014, a program flow that includes the first microservice object and the second microservice object is executed. The program flow may include other objects, as described above, that are also executed in the program flow. For example, the application server 114 may execute the program flow using the execution application 134.

At 1016, the usage data is updated according to executing the program flow. For example, if the execution of the program flow results in microservice X being executed followed by microservice Y being executed, the usage data is updated with this information. The application server 114 may instruct the database system 112 to update the usage database 122, as controlled by the update application 136. As the usage database 122 is updated with additional usage data from multiple users, the system is able to make suggestions to a user that correspond to how other program flows have been executed in the past.

The following sections provide more detail for the systems and methods described above.

Usage Data and Suggestions

The usage data corresponds to "wisdom of the crowd" regarding microservices. When the usage data indicates that microservice X is commonly followed by microservice Y, the system is able to analyze the usage data and suggest microservice Y after the user has decided to use microservice X. While designing the program flow, the system matches the pattern and suggests the best suitable microservice or next best suited microservice using the "wisdom of the crowd". If the user finds it suitable, the best suited microservice gets utilized. This saves time for the user, and also functions as a discovery mechanism for the user to discover previously unknown microservices.

When the application server 114 (see FIG. 1) is accessed by multiple client computers 116, the usage statistics become updated according to the program flows of all the users of the client computers 116.

The usage pattern of microservices is captured and stored in the usage database 122 along with some of the filter parameter details for further analysis. Only the usage pattern of the program flow needs to be captured; any transactional data may be abstracted out. The filter parameter details may include geographic location, popularity, user experience level, user rating, execution count, and recent usage. The geographic location corresponds to the geographic location of the user who designed the particular program flow; the system assigns higher weight to usage data in the same geographic location as the current user. The popularity corresponds to the number of times the particular microservice has been used in program flows; the system assigned higher weight to more popular microservices. The user experience level corresponds to the user experience level of the user who created the particular program flow; the system may assign higher weight to more experienced users, or may assign higher weight to those other users who have a similar experience level as the current user. The user rating corresponds to a user rating that other users have assigned to various microservices; the system assigns higher weight to the higher rated microservices. The execution count corresponds to the number of times the microservice has been executed; the system assigns higher weight to the microservices that have been executed more. The recent usage corresponds to the time (e.g., timestamp) when a particular microservice was implemented in a program flow or executed; the system may assign a high weight to the most recent uses (e.g., within 1 month), a medium weight to older uses (e.g., within 2-12 months), and a low weight to the oldest uses (e.g., over 12 months). The parameters considered here will help the analytical solution to find the best possible option, according to the highest weight.

Alternatively, the geographical information provides a first subset of choices in the current user's region. The popularity provides a second subset for nailing down the most obvious choice. The recent usage provides a third subset for getting the current trend of usage in case there is a tie between the choices.

The system updates the usage database 122 as a new program flow is created or an existing program flow is executed.

The sequential usage pattern of microservices (that is the successors and processors of micro services) is captured and stored into the usage database 122 for analysis of the possible flow paths. For example, sequences of two microservices X and Y, where Y follows X in a program flow, are stored as one sequential usage pattern. Sequences of three microservices X, Y and Z are also stored. For example, one sequence is that Y follows X and Z follows Y. Another sequence is that both Y and Z follow X in parallel. Similarly, sequences of four microservices, five microservices, etc. may be stored.

To rank the suggestions, the system calculates the weight of the stored sequential usage patterns. For example, three microservices X, Y and Z may form various usage patterns, including Y following X, X following Y, Z following Y following X, both Y and Z following X, etc. When the system calculates the weights, the pattern "Y following X"

has the most weight and is ranked highest, the pattern "Z following Y following X" has the next most weight and is ranked next, and the pattern "both Y and Z following X" has the least weight and is ranked last.

While designing the program flow, the system provides to the user recommendations on the most likely possible flows, as computed according to the weights assigned to the usage data. The recommendation is based on the stored patterns and parameters. The system may suggest a single next microservice, or a sequence of multiple next microservices that result from computing the weights on the usage data.

The system may suggest the top N recommendations resulting from the weighted usage data, where N is configurable (default of 5). Accuracy of the system will increase once there are more users and more data and patterns for the selection of the microservice. This will ease the complexity of finding and selecting the next possible and best of the breed microservices that are available for use. It will also reduce the design time, which will enable the faster creation of the program flows.

An example of calculating weights is as follows. For brevity, the weight is calculated for three example usage patterns. In the actual system, there may be thousands of users and millions of usage patterns, so it is not possible to calculate the weights using pencil and paper. The three usage patterns are microservice X followed by microservice Y ("X-Y"), X followed by Y followed by Z ("X-Y-Z"), and X followed by both Y and Z ("X-YZ"), and have parameters as follows (where e.g. "timestamp 1" is a label for the specific timestamp associated with the pattern):

Pattern X-Y (timestamp 1, geographic location 1, popularity 1, user experience level 1, user rating 1, execution count 1)

Pattern X-Y-Z (timestamp 2, geographic location 2, popularity 2, user experience level 2, user rating 2, execution count 2)

Pattern X-YZ (timestamp 3, geographic location 3, popularity 3, user experience level 3, user rating 3, execution count 3)

When the user has selected the microservice object X (see 1006 in FIG. 10), the system calculates the weights for all the usage patterns in the usage database 122 (see FIG. 1) that start with X (see 1008 in FIG. 10). The equation for the weight calculation may be as follows:

$$W_i = w_{time} + w_{geo} + w_{pop} + w_{exp} + w_{rate} + w_{exec}$$

where $W_i$ is the total weight calculated for a given pattern i, and $w_{time}$, $w_{geo}$ etc. are the subweights calculated according to the parameters for that given pattern i. For example, the subweight calculated for the timestamp weight $w_{time}$ compares the current system time with the timestamp to determine the age of the given pattern i, and applies a weighing factor to normalize that subweight with the other subweights. As another example, if the given pattern i was created in the same geographic area as the current user, $w_{geo}$ is given the value 1, otherwise it is 0.

Assume the results of the weight calculations are that Pattern X-Y has a weight of 1000, Pattern X-Y-Z has a weight of 900, and Pattern X-YZ has a weight of 50. The system then displays these results in the list (see 1008). The system may also display the weights so that the user can see that Pattern X-YZ is very uncommon.

An example of how the suggestion process operates is as follows, with reference to the user interface screen 200 of FIG. 2. The user has an idea of the service to be implemented with the program flow and starts by browsing the source area 202. The user finds a relevant microservice X and drags it into the flow layout area 204. The user places a flow arrow routing the output of the microservice X. The user clicks on a "suggestion" icon and the system calculates the weights of the usage data to see the most relevant microservices that follow microservice X according to the weighted usage data. The system displays the top 5 microservices with the highest weight that follow microservice X according to the usage data. The user selects one of the top 5 microservices, microservice Y. The system positions microservice Y following microservice X in the flow layout area 204, and the system updates the usage data with this new usage.

Figure 11:
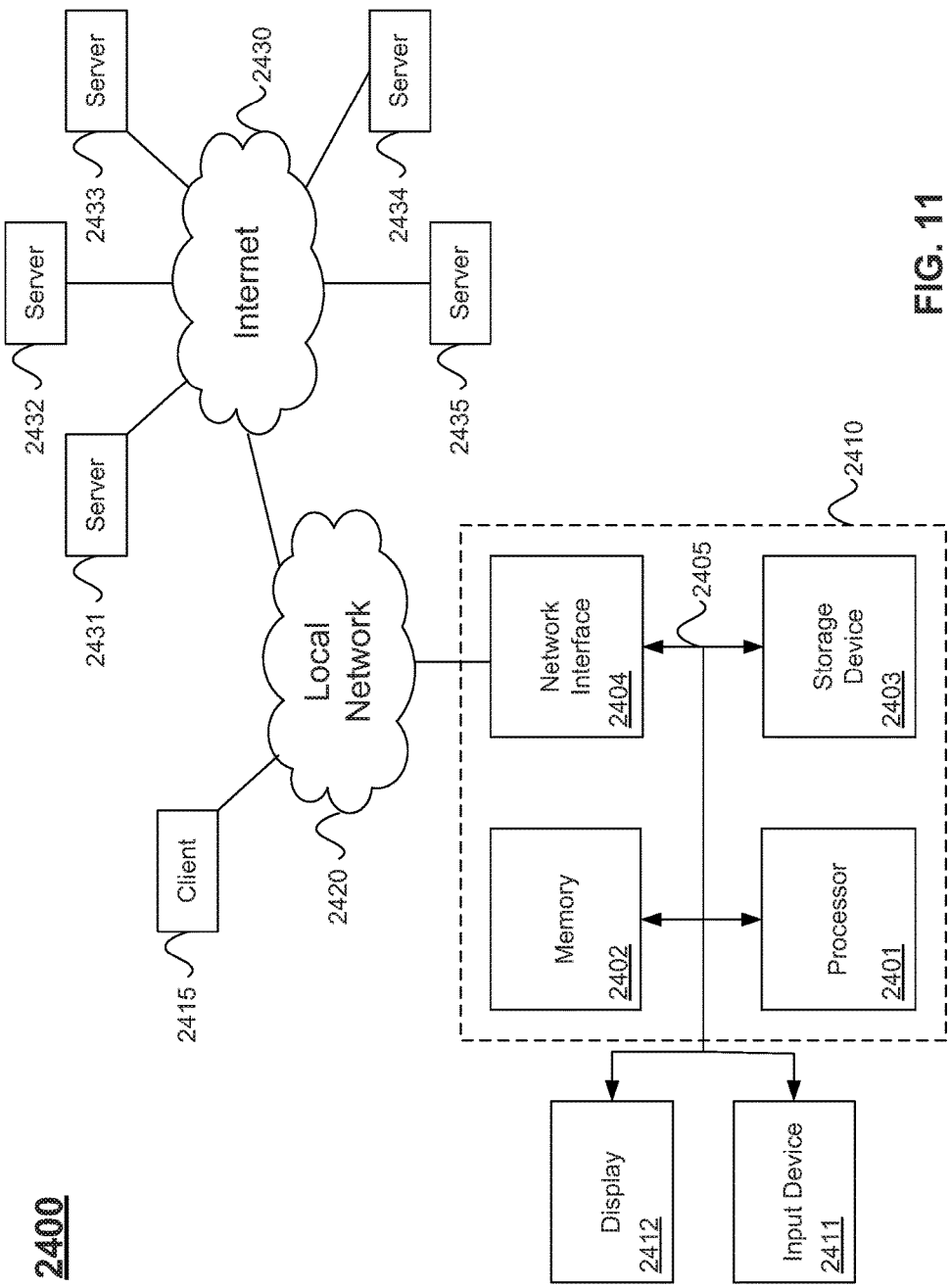
FIG. 11 is a block diagram of an example computer system and network 2400 for implementing embodiments of the systems and methods described above.

FIG. 11 is a block diagram of an example computer system and network 2400 for implementing embodiments of the systems and methods described above. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM), or both. A storage device 2403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2403 may include source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to the local network 2420, the local network 2421, an intranet, or the Internet 2430. In the network example, software components or services may reside on multiple different computer systems 2410 or servers 2431, 2432, 2433, 2434 and 2435 across the network. A server 2435 may transmit actions or messages from one component, through Internet 2430, local network 2421, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, the client 2415 may implement a client-side interface for displaying information generated by the server, for example via HTML or HTTP data exchanges. The computer system 2400 may implement the system 100 described above (see FIG. 1 and related text), for example by executing one or more computer programs. For example, the computer system 2410 may implement the application server 114 (see FIG. 1);

the client 2415 may implement the client computer 116 (see FIG. 1); the server 2431 may implement the database system 112 (see FIG. 1); the server 2432 may implement one or more of the microservices 110.

Pencil and Paper

Note that the implementations described above necessarily relate to computer technology and cannot be performed solely using pencil and paper. For example, as the user connects the microservice objects in the program flow, the system updates the usage statistics to reflect the arrangement set forth in the program flow. The updated statistics are then available for the system to make recommendations to other users. Since there are many users and many patterns in many program flows, the calculation of the weights for the recommendations cannot be performed using pencil and paper in order to produce useful results in a timely manner as the user is creating the flow program. As another example, as the system executes each program flow, the usage statistics are updated with the information that one microservice follows another when executing the program flow. As the execution necessarily involves computer technology, it cannot be performed using pencil and paper. As another example, some of the microservices relate to hardware sensors that generate measurement data for the microservices. It is not possible to read an RFID tag, to make a temperature measurement, etc. using pencil and paper. Thus, the features of the implementations described above cannot be performed solely using pencil and paper.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method of integrating microservices, the method comprising:

storing, by a computer system, a plurality of micro service objects and a plurality of usage data, wherein the plurality of usage data corresponds to prior usage of the plurality of microservice objects;

executing, by the computer system, a graphical environment for displaying and arranging one or more of the plurality of microservice objects;

receiving, by the computer system, a user selection of a first microservice object of the plurality of microservice objects and an arrangement of the first microservice object in the graphical environment;

determining, by the computer system, a list of suggested microservice objects of the plurality of microservice objects, wherein the computer system determines the list by processing the plurality of usage data according to at least the first microservice object, wherein the list of suggested microservice objects includes one or more of the plurality of microservice objects that follow the first microservice object according to the plurality of usage data; and receiving, by the computer system, a user selection of a second microservice object and an arrangement of the second microservice object in the graphical environment, wherein the second microservice object is one of the suggested microservice objects from the list, and wherein the second microservice object is linked to the first microservice object by a link according to the plurality of usage data.

2. The method of claim 1, wherein each microservice object of the plurality of microservice objects includes a functional component and a graphical component, wherein the graphical component is a graphical representation of the functional component, and wherein the functional component defines one or more inputs to the microservice object, one or more outputs from the microservice object, and a call to a microservice that is related to the microservice object.

3. The method of claim 1, wherein the plurality of microservice objects relates to a plurality of microservices, wherein at least one microservice of the plurality of microservices accesses a hardware sensor that generates measurement data for the at least one microservice.

4. The method of claim 1, wherein the plurality of microservice objects relates to a plurality of microservices, wherein at least one microservice of the plurality of microservices accesses a hardware sensor that generates measurement data for the at least one microservice, wherein the hardware sensor is one of a temperature sensor that generates temperature data, a motion sensor that generates motion data, a global positioning system (GPS) sensor that generates GPS data, a barcode scanner that generates barcode data, a microphone that generates audio data, a camera that generates image data, and a radio frequency identification (RFID) sensor that generates RFID data.

5. The method of claim 1, further comprising:

displaying, by the computer system, the plurality of microservice objects in a hierarchical display, wherein the first microservice object is selected from the hierarchical display.

6. The method of claim 1, further comprising:

displaying, by the computer system, a search related to the plurality of microservice objects, wherein the first microservice object is selected from results of the search.

7. The method of claim 1, further comprising:

receiving, by the computer system, a user selection of at least one input to the first microservice object.

8. The method of claim 1, wherein the computer system processes the plurality of usage data according to multiple microservice objects, wherein the multiple microservice objects includes the first microservice object.

9. The method of claim 1, wherein the computer system processes the plurality of usage data according to at least one of popularity information, geographical information, user experience information, user rating information, execution count information, and recently used information.

10. The method of claim 1, wherein the computer system processes the plurality of usage data by assigning a weight to at least one of popularity information, geographical information, user experience information, user rating information, execution count information, and recently used information.

11. The method of claim 1, wherein the link between the first microservice object and the second microservice object links at least one output of the first microservice object and at least one input of the second microservice object.

12. The method of claim 1, further comprising:
updating, by the computer system, the plurality of usage data according to the user selection of the second microservice object as related to the first microservice object.

13. The method of claim 1, further comprising:
updating, by the computer system, the plurality of usage data according to the user selection of the second microservice object as related to the first microservice object, wherein the computer system updates the plurality of usage data by adding a data item to the plurality of usage data, wherein the data item includes the second microservice object as related to the first microservice object and at least one of time stamp information, geographical information, execution count information, user experience information and user rating information.

14. The method of claim 1, further comprising:
receiving, by the computer system, a user selection of multiple microservice objects that are linked together in a program flow, wherein the multiple microservice objects include the first microservice object and the second microservice object.

15. The method of claim 1, further comprising:
receiving, by the computer system, a user selection of a decision object that is linked to the first microservice object and the second microservice object in a program flow.

16. The method of claim 1, further comprising:
executing, by the computer system, a program flow that includes the first microservice object and the second microservice object; and
updating, by the computer system, the plurality of usage data according to executing the program flow.

17. A system for integrating microservices, the system comprising:
a database system that stores a plurality of microservice objects and a plurality of usage data, wherein the plurality of usage data corresponds to prior usage of the plurality of microservice objects; and
an application server that executes a graphical environment for displaying and arranging one or more of the plurality of microservice objects,
wherein the application server receives a user selection of a first microservice object of the plurality of microservice objects and an arrangement of the first microservice object in the graphical environment,
wherein the application server determines a list of suggested microservice objects of the plurality of microservice objects, wherein the application server determines the list by processing the plurality of usage data according to at least the first microservice object, wherein the list of suggested microservice objects includes one or more of the plurality of microservice objects that follow the first microservice object according to the plurality of usage data, and
wherein the application server receives a user selection of a second microservice object and an arrangement of the second microservice object in the graphical environment, wherein the second microservice object is one of the suggested microservice objects from the list, and wherein the second microservice object is linked to the first microservice object by a link according to the plurality of usage data.

18. The system of claim 17, wherein the plurality of microservice objects relates to a plurality of microservices, wherein at least one microservice of the plurality of microservices accesses a hardware sensor that generates measurement data for the at least one microservice.

19. A non-transitory computer readable medium storing a computer program for controlling a computer system to execute processing for integrating microservices, the processing comprising:
storing, by the computer system, a plurality of microservice objects and a plurality of usage data, wherein the plurality of usage data corresponds to prior usage of the plurality of microservice objects;
executing, by the computer system, a graphical environment for displaying and arranging one or more of the plurality of microservice objects;
receiving, by the computer system, a user selection of a first microservice object of the plurality of microservice objects and an arrangement of the first microservice object in the graphical environment;
determining, by the computer system, a list of suggested microservice objects of the plurality of microservice objects, wherein the computer system determines the list by processing the plurality of usage data according to at least the first microservice object, wherein the list of suggested microservice objects includes one or more of the plurality of microservice objects that follow the first microservice object according to the plurality of usage data; and
receiving, by the computer system, a user selection of a second microservice object and an arrangement of the second microservice object in the graphical environment, wherein the second microservice object is one of the suggested microservice objects from the list, and wherein the second microservice object is linked to the first microservice object by a link according to the plurality of usage data.

20. The non-transitory computer readable medium of claim 19, wherein the plurality of microservice objects relates to a plurality of microservices, wherein at least one microservice of the plurality of microservices accesses a hardware sensor that generates measurement data for the at least one microservice.

* * * * *